July 9, 1963  E. G. RICHNOW, JR  3,096,995
AXLE LIFT

Filed July 16, 1962  2 Sheets-Sheet 1

Erick G. Richnow, Jr.
INVENTOR.

BY Ranselaer O. Wyatt
ATTORNEY

July 9, 1963  E. G. RICHNOW, JR  3,096,995
AXLE LIFT
Filed July 16, 1962  2 Sheets-Sheet 2
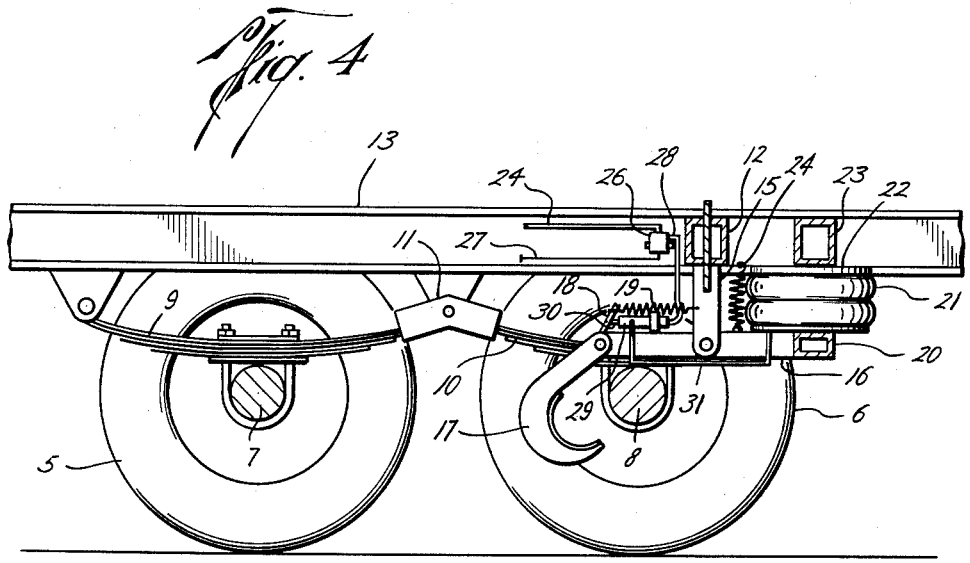
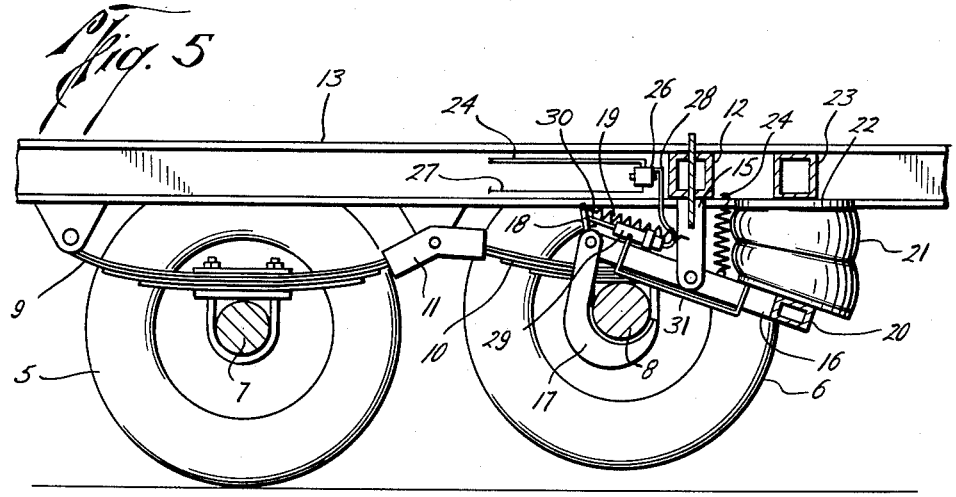
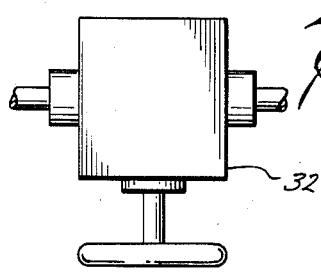
Erick G. Richnow, Jr.
INVENTOR.
BY
ATTORNEY United States Patent Office 3,096,995
Patented July 9, 1963

1

3,096,995
AXLE LIFT
Erick G. Richnow, Jr., Houston, Tex., assignor to Truck Accessories, Inc., Houston, Tex., a corporation
Filed July 16, 1962, Ser. No. 209,926
4 Claims. (Cl. 280—104.5)

This invention relates to new and useful improvements in an axle lift.

It is an object of this invention to provide a device for lifting one axle of a tractor or trailer free of the road surface when the vehicle is traveling empty.

It is another object of the invention to provide an axle lift having novel means for engaging an axle to be lifted and the controlled raising and lowering of the axle.

It is another object of the invention to provide means for lifting an axle on a tractor or trailer and shifting the weight distribution of the vehicle to provide less tire wear and easier steering of the vehicle.

It is another object of the invention to provide an axle lift for lifting an axle of a tandem trailer to provide less tire wear and greater traveling stability to the vehicle.

In the trucking industry, traveling empty has proven costly from the tire wear standpoint, due to bouncing and lack of traveling stability where tandem axles are employed. It is an object of this invention to provide a device for lifting one axle and the tires carried thereby so that the tires are free of the road surface, thus relieving tire wear on the lifted tires and concentrating the vehicle weight on the non-lifted tires, thus eliminating much of the bouncing effect of traveling empty over the road surface and the bouncing effect of brake application when stops are made.

With the above and other objects in view, the invention has relation to certain novel features of construction, operation and arrangement of parts more partciularly defined in the following specification and illustrated in the accompanying drawings, wherein:

FIGURE 4 is a side elevational view of the device mounted on a vehicle showing the device in inactive position.

FIGURE 5 is a cross sectional elevational view of the device mounted on a vehicle showing the device in axle lifting position, and FIGURE 6 is an enlarged view of a manually operated air valve employed.

Figure 1:
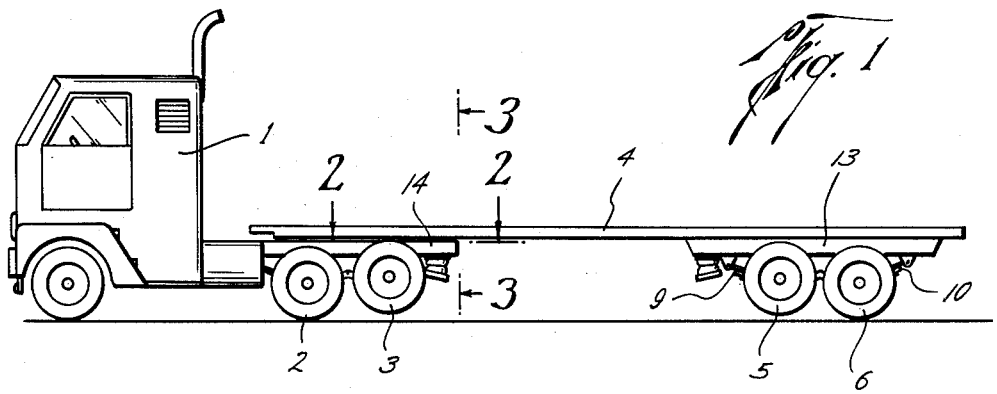
FIGURE 1 is a side elevational view of a tractor and trailer having one axle lifted on each.
Figure 2:
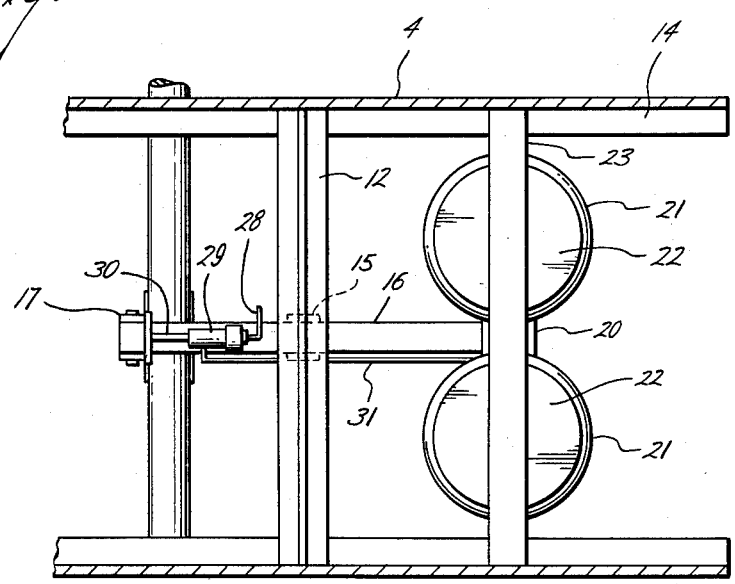
FIGURE 2 is a cross sectional top view of the device mounted on a tractor, taken on the line 2—2 of FIGURE 1.
Figure 3:
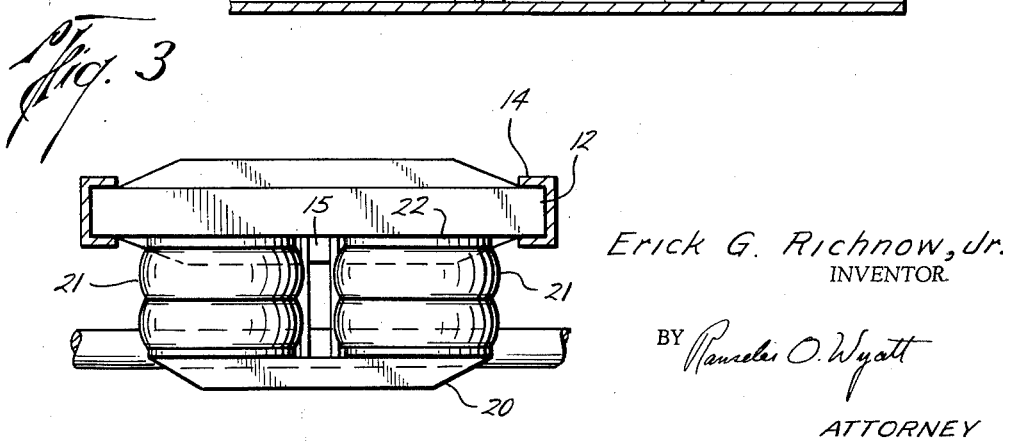
FIGURE 3 is a cross sectional end view of the device taken on the line 3—3 of FIGURE 1.

Referring now more particularly to the drawings, the numeral 1 designates a tandem tractor having tandem rear wheels 2, 3. Usually the wheels 2 are driven wheels, connected to the drive shaft (not shown) of the vehicle and the wheels 3 are drag wheels which may be lifted from the road surface.

A trailer, as 4, drawn by the tractor 1, carries the tandem wheels 5, 6 which are mounted on axles 7, 8, which are secured to the vehicle by means of the standard springs 9 and 10 having one end mounted in the standard swivel connection 11.

A cross member 12 is mounted on the channel iron frame 13 of the trailer or the frame 14 of the tractor, and midway of the longitudinal ends of the cross member 12 is the suspension bar 16.

On one end of the bar 16 is pivotally mounted the hook 17. A trigger 18 extends upwardly from the top of the hook 17 and extends outwardly at a slight angle. A suit-

2 able spring as 19 is connected at one end to the upper end of the trigger 18 and at its other end to the bracket 15, constantly urging the trigger 18 and hook 17 out of engagement with the axle 8.

On the other end of the bar 16 is a bellows support 20 on which the collapsible bellows 21, 21 are mounted. Upper plates 22, 22 are mounted on the tops of the bellows 21, 21 and welded, or otherwise secured, to the cross member 23 of the vehicle. A spring 24 secured at one end to the bar 16 between the bellows 21 and bracket 15 and at the other end to the frame 13 constantly urges the bar 16 into horizontal position.

A conduit 25 leads from a suitable source of air supply (not shown) to the solenoid controlled valve 26 and an electrical conduit 27 leads from the solenoid controlled valve 26 to a position of remote control, such as the dash board of the tractor. An air conduit 28 leads from the valve 26 to the cylinder 29. A piston driven arm 30 extends outwardly from the cylinder 29 and abuts the trigger 18 and a bypass conduit 31 leads from the cylinder 29 to the bellows 21, 21.

When the operator of the vehicle wishes to raise one axle off of the road surface, the dash board mounted switch (not shown) is actuated to activate the solenoid valve 26 sending air through the conduit 28 to the valve 29, moving the arm 30 against the trigger 18, pivoting the hook 17 to a position under the axle to be raised. As the arm 30 is extended and the hook 17 positioned beneath the axle, the air will pass through the conduit 31 into the bellows 21, 21 inflating the bellows and pivoting the bar 16, raising the axle 18 and the tires 6 free of the road surface. When it is desired to place the tires 6 back into vehicle supporting position, the valve 26 is reversed and the air allowed to escape from the bellows 21 and cylinder 29, and the springs 19, 24 return the hook 17 and bar 16 to inactive position. While the vehicle is traveling with the lifting mechanism in inactive position, the device in no way interferes with the normal operation of the axle, springs or wheels.

If it is desired, the manually operated valve 32, shown in FIGURE 6, may be employed in lieu of the valve 26, so that the valve controlling the operation of the lifting device may be mounted on a trailer and operated from the trailer rather than from the cab of the tractor.

While the foregoing is considered a preferred form of the invention, it is by way of illustration only, the broad principle of the invention being defined by the appended claims.

What I claim is:

1. In an axle lift, a pivotal bar suspended from a vehicle frame, a pivotal hook mounted on one end of said bar and movable into engaged relation with one axle of the vehicle, bellows on the other end of said bar, means connected to said hook and said frame for constantly urging said hook into a position disengaged from said axle when said bellows is in a collapsed position, fluid pressure means for pivoting said hook into engagement with said axle, and means connected to said vehicle frame for selectively applying fluid pressure to said fluid pressure means for pivoting said hook into engaged relation with said axle for thereafter inflating said bellows to raise said hook and the axle engaged thereby.

2. In an axle lift for raising and maintaining one axle of a tandem axle vehicle, a support mounted transversely on the frame of a vehicle, a pivotal bar suspended from said support, a pivotal hook mounted on one end of said pivotal bar and a transverse bellows support mounted on the other end of said bar, a pair of collapsible bellows mounted on said bellows support, means for constantly urging said hook and bellows into inactive position, a source of supply of air under pressure, conduits leading from said source of supply to said bellows, a valve controlling the flow of said supply of air, a valve on said pivotal bar connected into said conduits, means in said last mentioned valve for first pivoting said hook into engaged position with an axle to be lifted and then inflating said bellows.

3. An axle lift for use with a vehicle frame having at least two pairs of wheels arranged in tandem, wherein each pair of wheels has shock-absorbing means operably connected to its axle for absorbing shock during the normal use of the wheels on the ground, the improvement residing in,
(a) a resilient expansible means connected to said vehicle frame for exerting upward lifting force on the axle of one pair of said wheels when said resilient expansible means is expanded and also for providing resilience when said one pair of wheels is on the ground,
(b) a pivotal bar pivotally connected to the vehicle frame,
(c) means connecting said resilient expansible means to said pivotal bar for pivoting said bar upon an expansion of said resilient expansible means,
(d) a releasable attachment means connected to said pivotal bar for releasably attaching same to said axle, and
(e) actuating means for actuating said attachment means for engaging same with said axle when said wheels on said axle are on the ground for the subsequent lifting of said axle upon an expansion of said resilient expansible means.

4. An axle lift for use with a vehicle frame having at least two pairs of wheels arranged in tandem, wherein each pair of wheels has shock absorbing means operably connected to its axle for absorbing shock during the normal use of the wheels on the ground, the improvement residing in:
(a) a fluid bellows connected to said vehicle frame for exerting an upward lifting force on the axle of one pair of said wheels when said resilient expansible means is expanded and also for providing resilience when said one pair of wheels is on the ground,
(b) a pivotal bar pivotally connected to the vehicle frame,
(c) means connecting said resilient expansible means to said pivotal bar for pivoting said bar upon an expansion of said resilient expansible means,
(d) a hook pivotally connected to said pivotal bar for releasably attaching same to said axle, and
(e) actuating means for pivoting said hook into engagement with said axle when said wheels on said axle are on the ground for the subsequent lifting of said axle upon an expansion of said resilient expansible means.

References Cited in the file of this patent

UNITED STATES PATENTS

| | | |
|---|---|---|
| 1,690,040 | Sosdian | Oct. 30, 1928 |
| 2,599,043 | Bissell | June 3, 1952 |
| 2,712,856 | MacPhee | July 12, 1955 |